United States Patent Office 2,796,150
Patented June 18, 1957

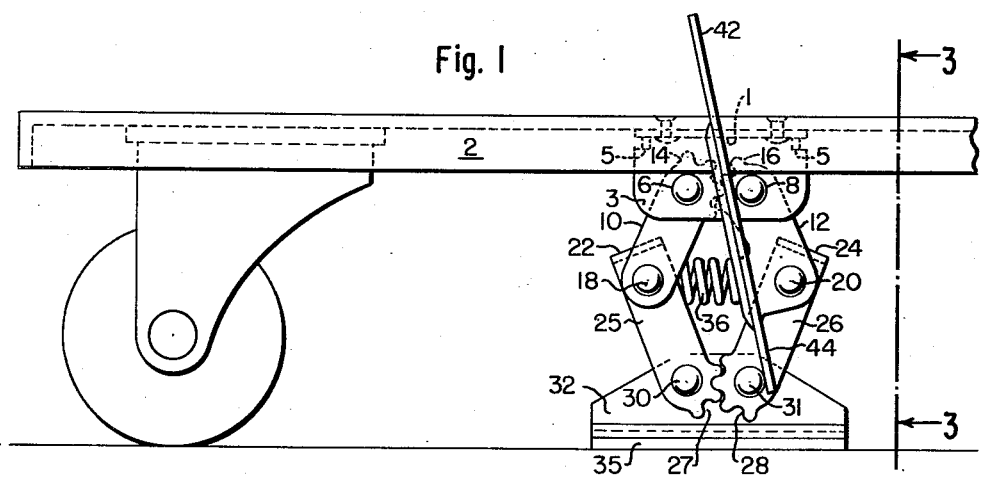

2,796,150
GROUND ENGAGING VEHICLE BRAKE

Carmine J. Gambardella, Warwick, R. I., assignor to Lee Engineering Company, Pawtucket, R. I., a corporation of Rhode Island Application October 12, 1955, Serial No. 540,006

5 Claims. (Cl. 188—5)

Portable lifts of the type comprising a truck mounted on casters and equipped with either a manually or electrically operated lifting mechanism are commonly used in factories and warehouses to convey and stack containers, boxes, palletized loads, etc. Due to such factors as the weight of the load, uneven floor, and relative instability of the load, it is necessary both in receiving and discharging a load to hold the truck firmly on the floor. To this end individual locking pins for the casters are sometimes used, but the time and inconvenience involved in applying and removing the locking pins is such as to discourage their use. An alternative arrangement consists of a locking jack which depends from the underside of the truck so that its locking foot may be moved against the floor or retracted upwardly to provide a clearance above the floor of the order of an inch or two. When such trucks are used on uneven or littered floors, or on a way having obstructions, the brake jack is apt to be snapped off and/or the truck tipped so as to jeopardize the load.

The principal objects of the present invention are to overcome the aforementioned difficulties and to provide a simple, efficient, and reliable brake which may be readily attached to a truck chassis, or the like wheeled vehicle, or to a platform, skid, pallet, scale, or other portable device, so as to be quickly operated and released by a simple manipulation of the foot.

Other objects are to provide a brake which has a greater travel from closed to open or braking position so that it may be used on trucks having larger casters than are now generally provided, and to provide a brake in which the brake shoe is at all times maintained parallel to the chassis and ground.

Further objects relate to various features of construction and will be apparent from a consideration of the following description and the accompanying drawings wherein:

Fig. 1 is a side elevation of my new floor brake applied to a portable lift truck and shown in open or braking position;

Fig. 2 is a view similar to Fig. 1, but showing the brake in closed or retracted position; and Fig. 3 is a section on the line 3—3 of Fig. 1.

The embodiment herein shown for the purpose of illustration comprises an inverted channel shaped member 1 adapted to be welded, bolted or otherwise suitably secured to the underside of a chassis 2 of a conventional lift truck so that the flanges 3 and 4 project downwardly. The upper corners of the flanges 3 and 4 are provided with inwardly struck ears constituting stops 5 and the body of the flanges are provided with two pairs of spaced openings which receive headed studs or rivets 6 and 8 pivotally connecting the upper ends of inner and outer links 10 and 12 to the flanges 3 and 4, respectively. The upper ends of these links are formed with sector gears 14 and 16 (Fig. 1) which mesh at all times so that movement of one link causes a corresponding movement of its companion link.

The lower ends of the links 10 and 12 are pivotally connected by pins 18 and 20 with the upper or closed ends of a pair of inverted U-shaped members 22 and 24 having depending legs 25 and 26 which with links 10 and 12 define four pairs of toggle links, the upper links 10 and 12 being slightly longer than the lower links 25 and 26 so as to prevent the links from becoming locked when collapsed. The lower ends of the links 25 and 26 are also formed with intermeshing sector gears 27, 28 and are pivotally connected at space points by studs or rivets 30 and 31 to a pair of upstanding flanges 32 and 33 integral with a brake foot which carries a friction pad or shoe 35.

The ends of a pair of tension springs 36 and 38 are connected to the pins 18 and 20 so that each pair of toggle links are drawn inwardly toward the companion pair, thus holding the brake foot in extended or braking position, as shown in Figs. 1 and 3. The links are movable from extended or braking position to retracted position (Fig. 2) by a lever 40 integrally connected with the outer link 12 by a laterally extending web 41 (Fig. 3) and the opposite ends of the lever are formed with extensions 42 and 44 which provide treadles for swinging the lever from one position to another by the foot of the operator.

With this construction and arrangement of parts the lever 40 when swung downwardly by pressure applied to the treadle 42 acts on the outer link 12 which in turn acts through the sector gears and associated links to draw the brake foot from extended position to retracted position, wherein the links and springs are virtually within the confines of the flanges 4 and 5, in which position the links are at approximately "dead center" with the links 10 and 12 in engagement with the stops 5, as indicated in Fig. 2. When in retracted position pressure may be applied to the treadle 44 to swing the lever 40 clockwise (Fig. 2) a distance sufficient to permit the springs 36 and 38 to come into action so as to extend the foot brake to braking position.

An outstanding feature of my new brake is the provision of the sector gears which at all times maintain the brake shoe parallel to the chassis and floor, and prevents tilting of the shoe with consequent impairment of braking action. Another feature is that the brake shoe has a greater travel from retracted to extended position and hence can be adapted for use with several different size wheels, whereas the conventional brake is usually designed for use with only one specific size wheel. A further feature of the invention is the provision of the inverted U-shaped members, constituting the lower toggle links, which give much greater stability and rigidity to the device.

Although the invention is herein illustrated as applied to a lift truck, it is to be understood that its utility is not so limited as it is obviously applicable to any conveyance which may be drawn along a floor or the like surface. It is also to be understood that this disclosure is for the purpose of illustration and that various changes and modifications may be made without departing from the spirit and scope of the invention as set forth in the appended claims.

I claim:

1. A brake of the class described, comprising a flange member adapted for attachment to the underside of a truck chassis, a brake foot, a pair of oppositely facing toggle links movable from retracted position, wherein said links are in approximate dead center, to an extended position, corresponding ends of said toggle links being pivotally connected to said flange member and brake foot, intermeshing sector gears carried by at least one of the corresponding ends of said toggle links so that pivotal movement of one link imparts a corresponding movement of the other link, resilient means acting on said toggle links so as to draw them together and extend said foot to braking position after said links have been swung from dead center, and an operating lever acting on said toggle links so that when said lever is swung from one position to another it moves said brake foot from extended position or retracted position.

2. A brake of the class described, comprising a flange member adapted for attachment to the underside of a truck chassis, a brake foot, a pair of oppositely facing toggle links movable from retracted position, wherein said links are in approximate dead center, to an extended position, corresponding ends of said toggle links being pivotally connected at spaced points to said flange member and brake foot, the corresponding ends of the toggle links being shaped to provide intermeshing sector gears arranged so that pivotal movement of one link imparts a corresponding movement to the companion link, springs acting on said toggle links so as to draw them together and extend said foot to braking position after said links have been swung from dead center, and an operating lever connected to one of said toggle links so that when said lever is swung from one position to another it moves said brake foot from extended position to retracted position.

3. A brake of the class described comprising a pair of spaced depending flanges adapted for attachment to the underside of a chassis, a brake foot having a pair of spaced upstanding flanges, a pair of inverted U-shaped links having their lower ends pivotally connected at spaced points to said upstanding flanges, intermeshing sector gears carried by said lower ends so that movement of one link imparts a corresponding movement to the other link, links pivotally interconnecting to the upper ends of said U-shaped links with said depending flanges so as to provide four pairs of toggle links movable from retracted positioned, wherein said links are in approximate dead center, to extended position, springs connecting said toggle links so as to draw them together and extend said foot to braking position after said links have been swung from dead center, and an operating lever acting on said toggle links so that when said lever is swung from one position to another it moves said brake foot from extended position to retracted position.

4. A brake of the class described comprising a pair of spaced depending flanges adapted to be attached to the underside of a chassis, a brake foot having a pair of spaced upstanding flanges, a pair of inverted U-shaped links having their lower ends pivotally connected at spaced points to said upstanding flanges, links pivotally interconnecting the upper ends of said U-shaped links with said depending flanges at spaced points so as to provide four pairs of toggle links movable from retracted positioned, wherein said links are in approximate dead center, to extended positions, the corresponding ends of said links being shaped to provide intermeshing sector gears operative to impart the same degree of movement to all links, springs connecting said toggle links so as to draw them together and extend said brake foot after said links have been swung from dead center, and an operating lever integrally connected with one of said toggle links so that when said lever is swung from one position to another it moves said brake foot from extended position to retracted position.

5. A brake as set forth in claim 1, wherein one link of each toggle is longer than the other link.

References Cited in the file of this patent

UNITED STATES PATENTS

| | | |
|---|---|---|
| 1,006,659 | Hormel | Oct. 24, 1911 |
| 1,736,202 | Larson | Nov. 19, 1929 |
| 2,169,508 | Ulrich | Aug. 15, 1939 |
| 2,703,632 | Gambardella | Mar. 8, 1955 |
| 2,747,692 | Holmes | May 29, 1956 |